(No Model.) 2 Sheets—Sheet 2.
C. G. STEVENS.
OPTOMETER.
No. 446,032. Patented Feb. 10, 1891.
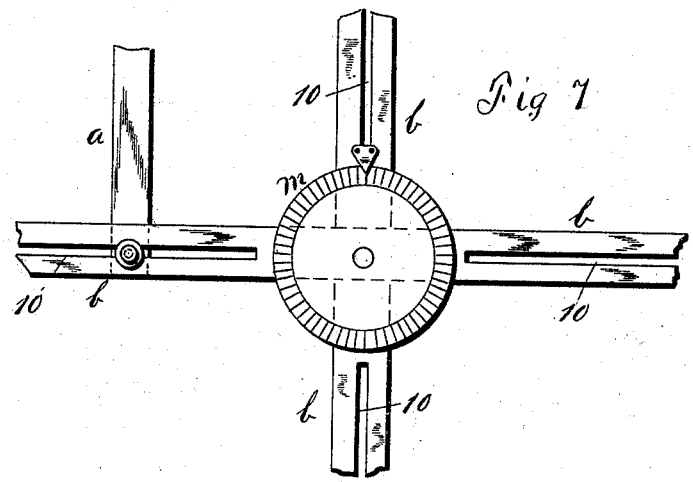
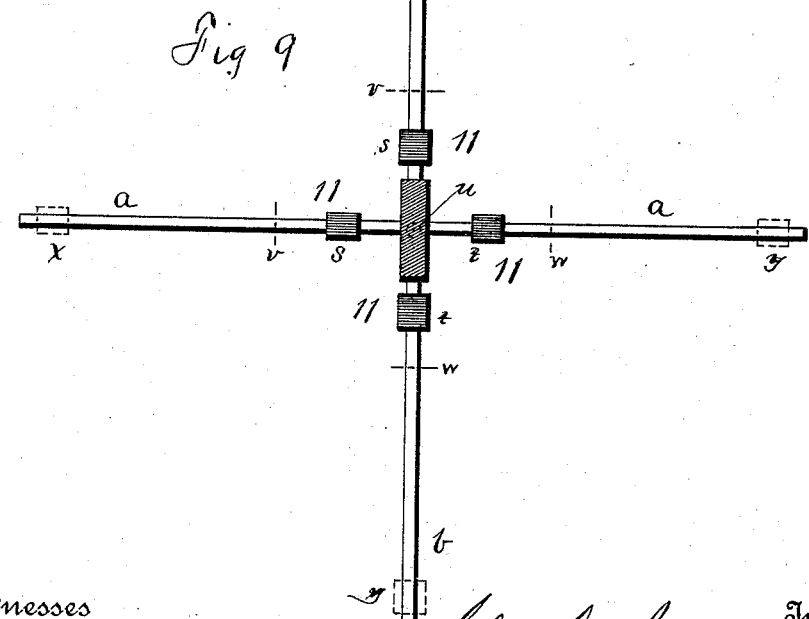
Witnesses
H. P. Denison
Pete McAnchester
Inventor
Calvin Gay Stevens
By his Attorneys
Smith & Denison

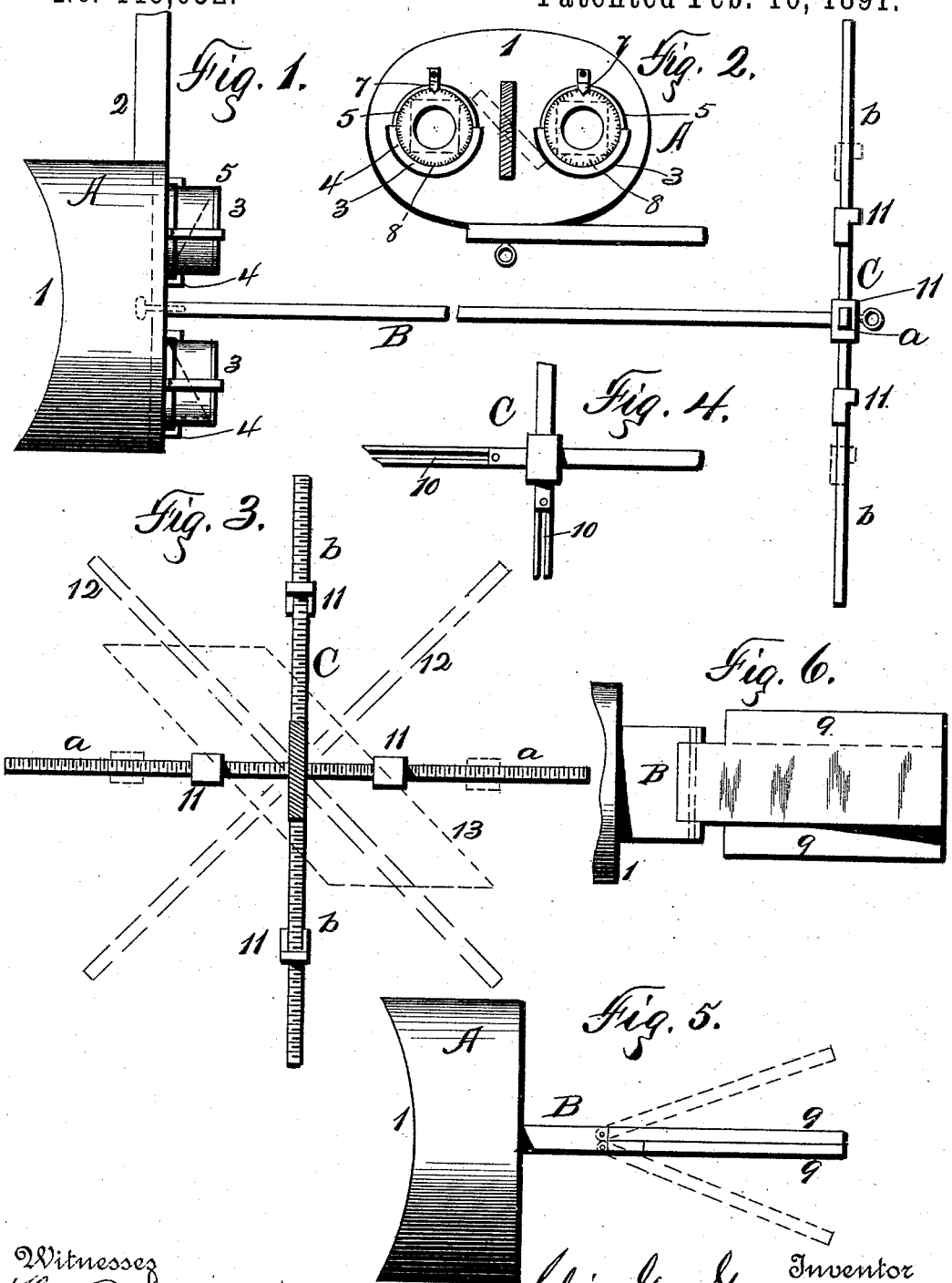

UNITED STATES PATENT OFFICE.

CALVIN GAY STEVENS, OF WATERTOWN, NEW YORK.

OPTOMETER.

SPECIFICATION forming part of Letters Patent No. 446,032, dated February 10, 1891.

Application filed April 8, 1890. Serial No. 347,092. (No model.)

*To all whom it may concern:*

Be it known that I, CALVIN GAY STEVENS, of Watertown, in the county of Jefferson, in the State of New York, have invented new and useful Improvements in Optometers, of which the following, taken in connection with the accompanying drawings, is a full, clear, and exact description.

My invention relates to devices and mechanism for testing and exercising the muscles of the eyes to determine and measure the muscular insufficiencies or inequalities of strength of the muscles.

My object is to provide a mechanism by which to test and exercise the muscles of the eyes by viewing two objects simultaneously through one or two prisms, the objects being located at a fixed distance from the prisms and being separated by a partition-screen capable of rotation, so that the object seen by the right eye cannot be seen by the left eye, the objects being mounted in such manner as to be movable toward or from each other in a horizontal or vertical line, or at any angle of departure therefrom, scales being provided by which the inequality is accurately measured mathematically by measuring the distance the objects may be removed from the normal points, where they appear as one, to parallel visual lines to the point or points where they can no longer be held as one by muscular effort, and also measuring the movement from the normal points, where they may not appear as one to abnormal eyes, to the point where they do so appear, the prisms being mounted with their bases inward or outward, or up or down, or at any intermediate angle, in order to afford or permit such a variety of tests as to enable me to test all of the muscles and to determine and measure their inaccuracies, inequalities, and differences in the strength and action.

My invention consists in a device for testing and exercising the muscles of the eyeballs by means of prisms suitably mounted, by which when seen by each eye separately two real images are united into apparently one image, and by which by means of scales I measure the distance these objects are moved from their normal points or normal distance, so that the eyes can no longer hold them as one, but they appear as two objects, and also in the several novel features of construction and operation hereinafter described, and which are specifically set forth in the claims hereunto annexed. It is constructed as follows, reference being had to the accompanying drawings, in which—

Figure 1 is a top plan of my apparatus. Fig. 2 is a rear elevation of my prism-holder. Fig. 3 is an elevation of the object-holder detached. Fig. 4 is a detail of the object-holder, showing two of the arms slotted to permit adjustment of the arms to vary their length, and so that one vertical or horizontal arm may be slid at right angles to and along the horizontal or vertical bar. Fig. 5 is a top plan of the holder provided with wings hinged to the divider frictionally, so as to maintain themselves in any position to which they may be spread apart from each other, or in some instances constituting the divider. Fig. 6 is a side elevation of the same. Fig. 7 is an elevation of the arms, showing a scale to indicate the angle to which the arms are at any time set, and also showing one arm-section at a right angle to its body. Fig. 8 is a section of the joint where the section stands at a right angle. Fig. 9 is a plan of the arms and objects placed thereon at the normal distance from the center, and in dotted lines as moved to their disunited position.

A is the prism-holder, comprising a hood 1, mounted upon a leveling-bar 2, provided with an ordinary spirit-level (not shown) and provided on its inner face with prism-socket 3, consisting of a semicircular and inwardly-hooking or flanged rim 4 of proper size to receive and support the prism-carrier 5, which consists of box 6, open on one side to permit the insertion of a prism, as shown by dotted lines, a pointer 7, adapted, in conjunction with the scale of degrees 8 upon the box, to indicate the angle at which the prism is set. The set of the prism is effected by turning the box in the holder.

B is the visual divider or partition consisting of a flat piece of wood or metal connected to the rear face of the hood in such manner that it can be set up at any angle, as shown in Fig. 2, and either all in one piece or provided with wings 9, hinged thereto so as to be opened outward separately, one extending above and the other below the divider. These hinge connections are made tight enough in the joints so that the frictional contact of the ears of the hinge-leaves upon each other or upon the hinge-pintle will be sufficient to hold either wing in any position to which it may be moved in or out.

C is the object-holder connected to the outer end of the divider or on another standard or means of support. When the object-holder is placed at a distance of twenty feet or more from the prisms, then it is better to use the screen or divider shown in Fig. 6 or 3. The object-holder is pivotally mounted so that it can be set at any angle to the divider or support, and consists of four arms $a\ a\ b\ b$, intersecting each other at right angles, each arm being provided with a scale, as shown. The arms may be all in one piece or two, and when of two one is slotted, as at 10, to receive a guide or the shank of a set-screw inserted into or through the slot and into the other piece, so that when the set-screw is loosened one piece can slide in or out or up or down on the other to vary the length of the arms, and so that one horizontal or vertical arm may be adjusted in a direct line or at right angles to any horizontal or vertical bar, and be fastened by tightening the set-screw. Upon these arms I mount my objects 11, so that they can slide upon them. I can also provide a level or levels (not shown) upon the arms in order to adjust them horizontally or vertically, and also provide a scale $m$ to indicate the angle to which they are set out of a horizontal or vertical. The dotted lines 12 in Fig. 3 show the arms shifted at an angle.

The dividers are primarily used so that the object or objects seen by the right eye cannot be seen by the left, or vice versa. In Fig. 1 it is set so that the left eye will not see the object 11, which is seen by the right eye, and vice versa.

Divider B, as shown in Fig. 1, is preferable for a short distance, while that in Fig. 5 or at 13 in Fig. 3 is for any distance.

In Fig. 3 the divider 13 is not mounted on the arms, but is mounted pivotally on a short vertical divider pivotally connected to the hood, and the wings 14 are hinged to the divider and are widened out, as shown, so that one will project above and the other below the divider. It is operated as follows, reference being had to the principle that if vision from both eyes be directed through prisms at two objects in a plane corresponding to the set of the prisms—e. g., the horizontal plane and prisms set base out, the object being located at a fixed distance from the prisms and the screen-divider being set so that the objects are seen separately by each eye—at certain points they will blend and appear as one object, and then as they are moved from these points they will eventually appear as two separate objects, and also having reference to the principle that if vision be directed at a bisected line at certain distances each line-section will appear in the same straight line to the eyes viewing the sections separately, and if one section is removed from this straight line it will eventually appear broken or a different line than its fellow section. Reference is also had to the fact that normal eyes, without special training or idiosyncrasy, will see two objects separated by the divider as in their proper or actual positions, and without the training are incapable of uniting the two into apparently one whatever may be the position of the objects. The prisms are therefore used to assist the mental or semi-unconscious muscular effort in producing an apparent union or blending of the objects at other than the normal points. The prisms are placed in the holders bases outward, and the screen is adjusted so that corresponding parts of the arms are seen separately with each eye. The objects are then adjusted upon the horizontal arms the normal distance apart. This distance will vary with the strength or degree of prisms used. On one arm the object may be at a greater distance from the screen than on the other. I note these variations in distances upon the scales on the arms. The objects are now moved toward or from each other to the points where they can be and can no longer be held united as one, and where they do actually appear as two, and the measurements of these movements of objects will denote the power of the internal or external recti, as well as the differences existing between the eyes.

The muscles tested by the optometer are in sets—e. g., first, the internal rectus of the right eye, together with that of the left eye; second, the superior rectus of the right eye with the inferior rectus of the left. The tests determine a state of equilibrium of the eye-muscles, the tendency (and its extent) of the eyeballs or visual lines to rotate in or out, up or down, or combination of such tendencies, and also measure the power of each of the sets of muscles. Another test is made by placing the prisms in the holder base down before one eye and base up before the other. Then the objects are adjusted on the vertical arms at the normal points, when they will appear as one or two in the same vertical plane or show lateral deviation. They are now brought into the same vertical plane, the distance or prisms required denoting the manifest tendency of the visual lines in or out. They are now moved upon the bars to or from each other until they blend or are seen as one, and then they are moved to or from each other until they can no longer be held united, and the distances from the normal points will denote the power of the superior rectus of one eye with the inferior rectus of the other, and vice versa, according as the objects have been moved to or from each other.

Another test of the superior and inferior recti is made by arranging the prisms one base down and the other base up and the objects one higher than the other. In this test for any set of muscles the objects remain the same or fixed distances apart, and the test is made by having the arms movable toward or from the prisms along the screen, thus bringing the objects closer to or farther away from the eyes, they being originally located at the normal point, and any apparent variation in them being connected as aforesaid, and then by moving the arms and objects together to or from the eyes until they appear as two. I then measure the inequalities by a scale (not shown) along the divider.

The auxiliary screen 13 is used as a cover to conceal two of the objects, vertical or horizontal, while the other two are in use.

The hinged screens 9 are used for the same purpose by swinging them in or out a proper distance, especially to cover the objects on the horizontal base while those on the vertical ones are in use, or when the arms are set at an angle, as aforesaid, at the outer end of the divider, or on a separate standard for long distances.

I do not limit myself to the precise form of any of the several parts of my apparatus, as herein shown and described, for the reason that I claim to be the inventor of the principle of the measurement of the insufficiencies of the muscles of the eyes by means of prisms and objects movable toward or from each other.

In Fig. 7 I show the arms slotted, one outer section mounted so as to stand at a right angle to the inner portion, and also a scale and pointer to indicate the degree to which the arms may be moved or turned out or set out of a perpendicular.

In Fig. 9 I illustrate the principle of the movements of these objects from union to separation.

When the objects are at $s$ and $t$, they are at the normal points and appear as one at $u$, and when moved from each other they will still appear practically as one at $v\ w$; but when moved to $x\ y$ they are fully separated and appear as two. The distance $s\ x$ added to $t\ y$ represents the strength or power of the set of muscles being tested.

It will be apparent that the partition B can be provided with an ordinary spirit-level for leveling it up, and that one or more of the arms may be provided with like means for leveling, although such level or levels are not shown in the drawings; and it will also be seen that the leveling of the divider will also level the prism-holder and prisms.

What I claim as my invention, and desire to secure by Letters Patent, is—

1. An optometer consisting of a hood provided with prism-holders, prisms removably held therein, a screen adjustably connected to the hood between the prisms, arms adjustably mounted at the inner end of the screen, and objects movable and adjustable upon the arms, as set forth.

2. An optometer consisting of a hood provided with prism-holders, prisms removably held therein, a screen adjustably connected to the hood between the prisms, arms adjustably mounted upon the screen and provided with a measuring-scale, and objects mounted upon and adjustable in or out thereon, as set forth.

3. An optometer consisting of a hood provided with prism-holders, prisms removably held therein, a screen adjustably connected to the hood between the prisms, an auxiliary screen mounted adjustably thereon, arms adjustably mounted upon the main screen, a scale upon each arm, and objects movable or adjustable upon the arms, as set forth.

4. An optometer consisting of a hood provided with prism-holders mounted upon the hood adjustably to a scale of degrees, prisms removably held therein, a screen adjustably connected to the hood between the prisms, an auxiliary screen mounted adjustably thereon, arms adjustably mounted upon the main screen, a scale upon each arm, and objects movably adjustable upon the arms, as set forth.

5. An optometer consisting of a hood mounted upon a supporting-bar and provided with prism-holders, prisms removably held therein, a screen adjustably connected to the hood between the prisms, arms adjustably mounted upon the screen, objects movably adjustable upon the arms, a scale upon each arm, and means for leveling the prisms and the object-bars, as set forth.

6. The combination, with the stationary hood carrying removable prisms, of visual objects mounted and adjustable along bars set up at a fixed distance from the prisms, as set forth.

7. An optometer consisting of a hood carrying prisms, a divider, and arms carrying objects adjustable thereon.

8. An optometer consisting of a hood, prisms removably mounted in the hood, a divider, arms carrying objects adjustable thereon, and scales upon the arms.

In witness whereof I have hereunto set my hand this 13th day of March, 1890.

CALVIN GAY STEVENS.

In presence of—
   DAVID D. KIEFF,
   JOHN HOSE.